United States Patent [19]

Sudo et al.

[11] Patent Number: 5,739,542
[45] Date of Patent: Apr. 14, 1998

[54] X-RAY ANALYZING

[75] Inventors: Shuzo Sudo; Kunio Nakajima, both of Tokyo, Japan

[73] Assignee: Seiko Instruments Inc., Tokyo, Japan

[21] Appl. No.: 749,943

[22] Filed: Nov. 14, 1996

Related U.S. Application Data

[62] Division of Ser. No. 569,861, Dec. 8, 1995, Pat. No. 5,612,987, which is a continuation of Ser. No. 217,355, Mar. 25, 1994, abandoned.

[30] Foreign Application Priority Data

| Mar. 25, 1993 | [JP] | Japan | 5-67135 |
| Apr. 19, 1993 | [JP] | Japan | 5-91683 |
| Apr. 19, 1993 | [JP] | Japan | 5-91688 |

[51] Int. Cl.⁶ .................. G21K 4/00; H01J 31/50
[52] U.S. Cl. .................. 250/483.1; 250/368
[58] Field of Search .................. 250/367, 368, 250/320.09, 370.11, 483.1; 378/98.2, 98.8

[56] References Cited

U.S. PATENT DOCUMENTS

| 3,725,704 | 4/1973 | Buchanan . | |
| 3,743,833 | 7/1973 | Martic et al. | 250/483.1 |
| 4,274,000 | 6/1981 | Goebel . | |
| 4,446,568 | 5/1984 | Williams . | |
| 4,739,172 | 4/1988 | Obata . | |
| 4,821,303 | 4/1989 | Fawcett . | |
| 4,952,813 | 8/1990 | Miyahara et al. | 250/483.1 |
| 5,127,039 | 6/1992 | Hesch . | |
| 5,216,252 | 6/1993 | Boone . | |
| 5,367,172 | 11/1994 | Beutel et al. | 250/483.1 |
| 5,373,544 | 12/1994 | Goebel . | |

FOREIGN PATENT DOCUMENTS 0 187 066   7/1986   European Pat. Off. .

*Primary Examiner*—David P. Porta
*Attorney, Agent, or Firm*—Loeb & Loeb LLP

[57] ABSTRACT

An X-ray analyzing apparatus having high sensitivity and high position resolving power in which an X-ray fluorescent screen made of $Gd_2O_2S$:Tb as a material and having a surface density ranging from 5 mg/cm² to 30 mg/cm² is used, and an image intensifier and a charge coupled device (CCD) are combined to form an X-ray diffraction two-dimensional detector; and the image intensifier and the CCD are combined with a tapered fiber plate, and an alignment section of a mirror mount tube and a vacuum flexible tube are separated by an X-ray window ambient atmosphere and a vacuum.

4 Claims, 12 Drawing Sheets

X-RAY ANALYZING

This is a division of application Ser. No. 08/569,861, filed on Dec. 8, 1995, now U.S. Pat. No. 5,612,987, which is a Rule 62 FWC continuation of application Ser. No. 08/217,355, filed on Mar. 25, 1994, now abandoned.

BACKGROUND OF THE INVENTION

The present invention relates to an X-ray apparatus using X-ray diffraction, X-ray fluorescence, or X-ray transmission to identify or chemically analyze a microscopic area of a sample non-destructively and to scan the sample surface for performing area or line analysis of the sample.

The Japanese Patent Provisional Publication No. SHO59-72052 discloses one example of conventional X-ray analyzing apparatus. In this apparatus, a hollow capillary whose inside cross section has the form of a circle, an ellipse or a polygon and whose inner surface is parallel and mirror-finished is extended from an X-ray source to a sample fixed at the center of a sample stage composed of a three-axis precise movement mechanism and a biaxial rotational mechanism which are combined. An X-ray diffraction image and fluorescent X-rays of a microscopic area of tile sample are received by a film or a position sensitive proportional counter or a guide tube for measuring X-ray fluorescence. According to this structure, when a tiny and thin sample is to be analyzed, the hollow capillary extending from the X-ray source is brought close to tile sample, and a thin X-ray beam approximately as thin as an internal diameter of the hollow capillary is irradiated on the sample. The fluorescent X-ray emitted from the sample is received by the guide tube for measuring fluorescent X-rays and measured by a semiconductor detector arranged at the end of the guide tube. On tile other hand, the diffraction X-rays are measured by the film or the position sensitive proportional counter. By the above, materials in the microscopic area are identified and chemically analyzed, and the sample is area-analyzed or line-analyzed by a linear movement mechanism.

Another prior art apparatus is, for example, disclosed in the Japanese Patent Provisional Publication No. SHO61-22240. This prior art apparatus is composed of: a collimator for delivering a thin X-ray beam onto a minute part of a sample; a detachable spectrocrystal which is provided so that fluorescent X-rays emitted from a sample surface may be incident on the spectrocrystal; and an incident position sensitive X-ray detector in an arc provided so as to move around either a point which is symmetric to the microscopic area with respect to the surface of the spectrocrystal or the microscopic area. In this structure, when a tip of the collimator is brought in close proximity to the sample, a thin X-ray beam is formed and the beam irradiates the microscopic area of the sample. The microscopic area emits fluorescent X-rays, which are reflected by the spectrocrystal and whose energy is measured from a difference in incident position by the position sensitive X-ray detector in an arc which was moved around the point symmetric to an X-ray irradiation area with respect to the spectrocrystal. On the other hand, diffraction X-rays are measured by the incident position sensitive X-ray detector in an arc which was moved around the X-ray irradiation area. Thereby, materials in the microscopic area are identified and chemically analyzed. The material is moved by a rectilinear, or straight line, movement mechanism to be area-analyzed or line-analyzed.

In a manipulator for manipulating a thin X-ray beam, the intensity of the beam is greatly attenuated, depending on the energy and optical distance thereof, even when the beam energy is 5 keV or more. Therefore, to fabricate an X-ray optical system by using a visible light optical alignment bench for an X-ray optical element is difficult, so that a manipulator for exclusive use with X-ray optical systems to control the attenuation of X-rays in the air to a minimum using vacuum technology has been used.

An exemplary X-ray mirror manipulator is constructed as shown in FIG. 5. That is, it comprises a mirror mount tube 43 formed integral with the X-ray mirror, six vacuum-sealed micrometers 40 (four of which are visible in FIG. 5), a vacuum tube 46 for fixing the micrometers in a vacuum, a vacuum bellows 45 for securing rectilinear movement of mirror mount tube 43 in the longitudinal direction, a linear stage mechanism 41, vacuum flanges and supports 39, and an X-ray window 42 for separating the interior of tube 46, which is under a vacuum, from the surrounding atmosphere. The manipulator for an X-ray optical element performs bidirectional gates and bidirectional rectilinear movements on the inserted mirror mount tube 43 with respect to the vacuum tubes by means of the six micrometers, and linearly moves the vacuum tube 46 with respect to the flanges and supports by using the rectilinear stage mechanism 41. Accordingly, it is shown in FIG. 5 that the X-ray mirror in the mirror mount tube 43 in a vacuum-sealed state can be aligned in pentaaxial directions by the operation through the X-ray window in the atmosphere.

Further, X-ray position detectors are of two types depending on the way in which they detect fluorescent X-rays, transmission X-rays or X-ray diffraction intensity: a pulse counting type in which X-ray light quanta are counted one by one and an integral counting type in which the intensity of X-rays received by the detector for a predetermined time period is integrated for counting. Typical examples of position sensitive detectors having a position detection function capable of recording one-dimensionally or two-dimensionally location distribution of the X-ray density are a one-dimensional and a two-dimensional proportional counter tube, an X-ray film, an imaging plate, an X-ray television, a CCD X-ray sensor. Above all, the proportional counter tube, which is a pulse counter type detector, has excellent features to have one-dimensional or two-dimensional position resolving power and energy resolving power. On the other hand, the integral counting type detector is excellent in position resolving power for position detection, and an X-ray film is one of the examples which is most frequently used.

However, the Japanese Patent Provisional Publication No. SHO59-72052 discloses an apparatus in which a hollow capillary leads X-rays from an X-ray source to the center of a sample stage. Since this hollow capillary is a non-imaging optical element, it has a very large aberration. Further, when a distance of a few mm or more is kept between a sample and the hollow capillary, it is impossible to form X-rays into a thin X-ray beam having a diameter of μm order. In order to form a thin X-ray beam of μm order in accordance with the above structure, it is necessary that an inner diameter of the capillary which is equivalent to an X-ray outgoing pupil should be not more than the diameter of the area to be measured and also that a tip of the capillary should be arranged in close vicinity to the sample stage. However, if the tip of the capillary is in the vicinity of the sample stage, not only is the size of the sample restricted but also the permissible rotational angle of the sample stage is restricted. If the thickness of the hollow capillary is made smaller in order to avoid the restriction on the rotational angle, the hollow capillary transmits the X-rays and the effective diameter of the X-ray beam becomes larger than a required value, which results in a problem that a microscopic area cannot be analyzed.

Moreover, in the above prior art, a three-axis precise rectilinear movement mechanism is incorporated in a rotational mechanism, so that the size of the sample stage becomes smaller and the movement distance of the three-axis precise rectilinear movement mechanism is as short as a few millimeters or less.

Further, an apparatus disclosed in the Japanese Patent Provisional Publication No. SHO61-22240 uses a collimator for applying a thin X-ray beam from an X-ray source to a sample surface. A microscopic area of the sample irradiated with the X-rays depends on an inner diameter of the collimator and a distance between the collimator and the sample surface. Therefore, in the same way as the former publication, obtaining a minimum diameter of the X-ray beam requires a small inner diameter and also requires the collimator and the sample surface be in close proximity. Therefore, also in this case, the rotational angle of the sample surface is restricted by the collimator itself, thereby prohibiting a large rotational angle for the sample surface. Moreover, since the embodiment of this publication has only one rotational axis for the sample, it is difficult to measure diffraction X-rays when the number of crystal grains is small in the microscopic area irradiated with the X-rays.

As to the above two publications, samples to be measured are restricted to small ones. The reason is, as above mentioned, that the sample scanning distance of the sample stage is short and that sample gate rotation is restricted by the collimator or the hollow capillary. Because these X-ray optical elements perform bidirectional rectilinear movements and bidirectional gates with 6 micrometers, it wastes movement parameters. Next, since it performs the gate of the X-ray mirror only by the rectilinear mechanism of the micrometers, it is extremely difficult to operate the rectilinear components and the gate components independently of each other with respect to the pentaaxial alignment components of the X-ray mirror, and it is thereby difficult to perform alignment of the X-ray mirror. Further, since in FIG. 5 the rectilinear and gate operations of the mirror mount tube are performed inside the vacuum tube, it is necessary for each micrometer 40 to have a long stroke 44 and for the vacuum tube 46 to be given large dimensions. Further, the flanges and supports must necessarily be large, so that the manufacturing cost increases and the manipulator itself becomes large and heavy, no matter how small the X-ray optical element is. Also in the case of designing an optimal optical system, even when it is necessary to employ an X-ray mirror with a short operating distance and to insert a spatial filter midway in the optical distance determined by the X-ray mirror, there are still cases where these requirements are limited by the size of the manipulator. Concerning the structural problem, in addition to a problem as to the size of the system, the mounting and dismounting of the manipulator are not easy. Therefore, it is difficult to measure a thin film on a silicon wafer a few cm square or more, and a sample should be a minute chip.

Further, in an X-ray position detector, the method for detecting X-ray diffraction patterns depends on the wavelength of X-rays to be used and the kind of the X-rays, for example, characteristic X-ray and white X-rays. Generally, a one dimensional or two dimensional proportional counter tube which is a pulse counting detector has the limitation that counting loss due to dead time happens at a high counting rate and moreover proportion resolving power is not sufficient.

On the other hand, X-ray films and X-ray televisions which are integral counting detectors have low sensitivity, a narrow dynamic range and poor linearity. These shortcomings are less in an imaging plate, but after an X-ray image is recorded on the imaging plate, a He—Ne laser is used and a focused laser beam two-dimensionally scans on the imaging plate to read an X-ray latent image of the above X-ray image. The fluorescent intensity of the image is measured by a photomultiplier tube, and its output is multiplied by a logarithmic amplifier. Further, the output is converted into numeric values by an A/D converter, and then the image is recomposed by a computer. Apparatus of this type tends to cause readings to take much time and the size of apparatus is required to be large.

SUMMARY OF THE INVENTION

Accordingly, an object of the present invention is to provide a microscopic area measuring apparatus with high spatial resolving power and high sensitivity.

In apparatus according to the present invention, an X-ray generator is combined with a manipulator which has an X-ray optical element with a condensing and imaging function and an operation distance of 1 cm or more to provide a three-dimensional space between the X-ray optical element and a sample scanning table. This space makes it possible to insert an X-ray spatial filter for separating a monochrome and collimating between the X-ray optical element and the sample scanning table. Further, on the sample scanning table is provided a mechanism capable of large rotations and large gates, and thereon a three-dimensional rectilinear mechanism which can produce precise movements and moves over a range of at least 1 cm is attached. The three-dimensional rectilinear mechanism has a through hole provided in its part through which an X-ray optical axis passes. An X-ray detecting section is concentric with a rotational axis of the sample scanning table. The X-ray detecting section is a combination of a rectilinear mechanism for moving the section a predetermined distance in a direction of the rotational axis of the sample scanning table, and another rectilinear mechanism for moving the section in a direction orthogonal to the rotational axis direction. The above-described components are further combined with an X-ray position detector and/or an X-ray energy detector.

In a present invention, the X-ray position detector is a two-dimensional X-ray detector for detecting a small amount of X-rays which is composed of an X-ray fluorescent surface made of an X-ray fluorescent material which includes $Gd_2O_2$:Tb and whose surface density is 5 $mg/cm^2$–50 $mg/cm^2$, an image intensifier tube and a CCD. Further, the fluorescent surface is positioned on a tapered fiber plate in order to vary the area of a surface to be detected, and the image intensifier tube and the CCD are coupled by means of the fiber plate to make the best light efficiency.

As the above structure uses an X-ray optical element which has a condensing and imaging function and a movement range of 1 cm or more, it is possible to arbitrarily change the position of the sample in a space between the X-ray optical element and the sample scanning table. In other words, a sample having a half width of approximately 1 cm or less can be freely gate-rotated. Therefore, the use of the X-ray optical element with a longer operation distance makes it possible to gate-rotate further larger samples arbitrarily. In this case, the sample is scanned over a distance of 1 cm or more in three directions, so that an area equivalent to almost all the surface of the attached sample can be scanned and a sample of approximately 1 cm thick or less can be subjected to non-destructive measurement.

Moreover, the use of the X-ray position detector with the above structure enables highly sensitive measurement.

Further, in the above space, the use of a spatial filter facilitates making an X-ray beam monochromatic and changing the size of an aperture of the X-ray optical element. When an X-ray optical element having the condensing and imaging function is used, the reduction ratio and the X-ray source diameter depending on the X-ray optical element determines the X-ray beam diameter. Therefore, the use of a large reduction ratio and a small X-ray source diameter makes it possible to irradiate the sample with an X-ray beam which is far more precise compared with the above prior art. By providing a through hole on the sample scanning table, X-rays penetrating the sample on the sample table can be measured when the X-ray detecting section is rotationally moved along the X-ray axis. An X-ray detector can be placed at a desired position with the sample at the center by a detector moving mechanism attached to the X-ray detecting section.

DESCRIPTION OF THE PREFERRED EMBODIMENTS

Figure 1:
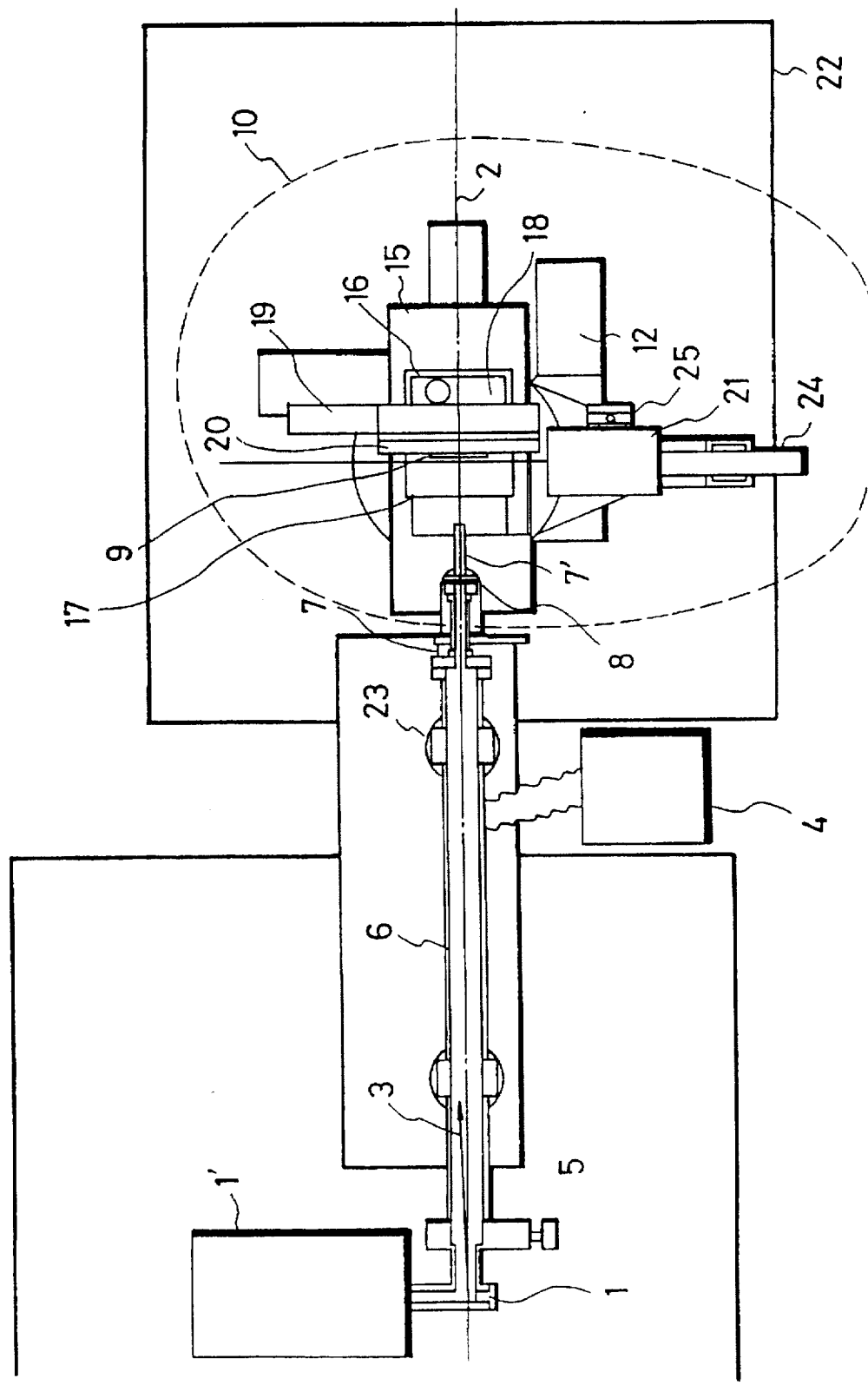
FIG. 1 is a schematic top plan view showing one embodiment of an X-ray analyzing apparatus according to the present invention.
Figure 2:
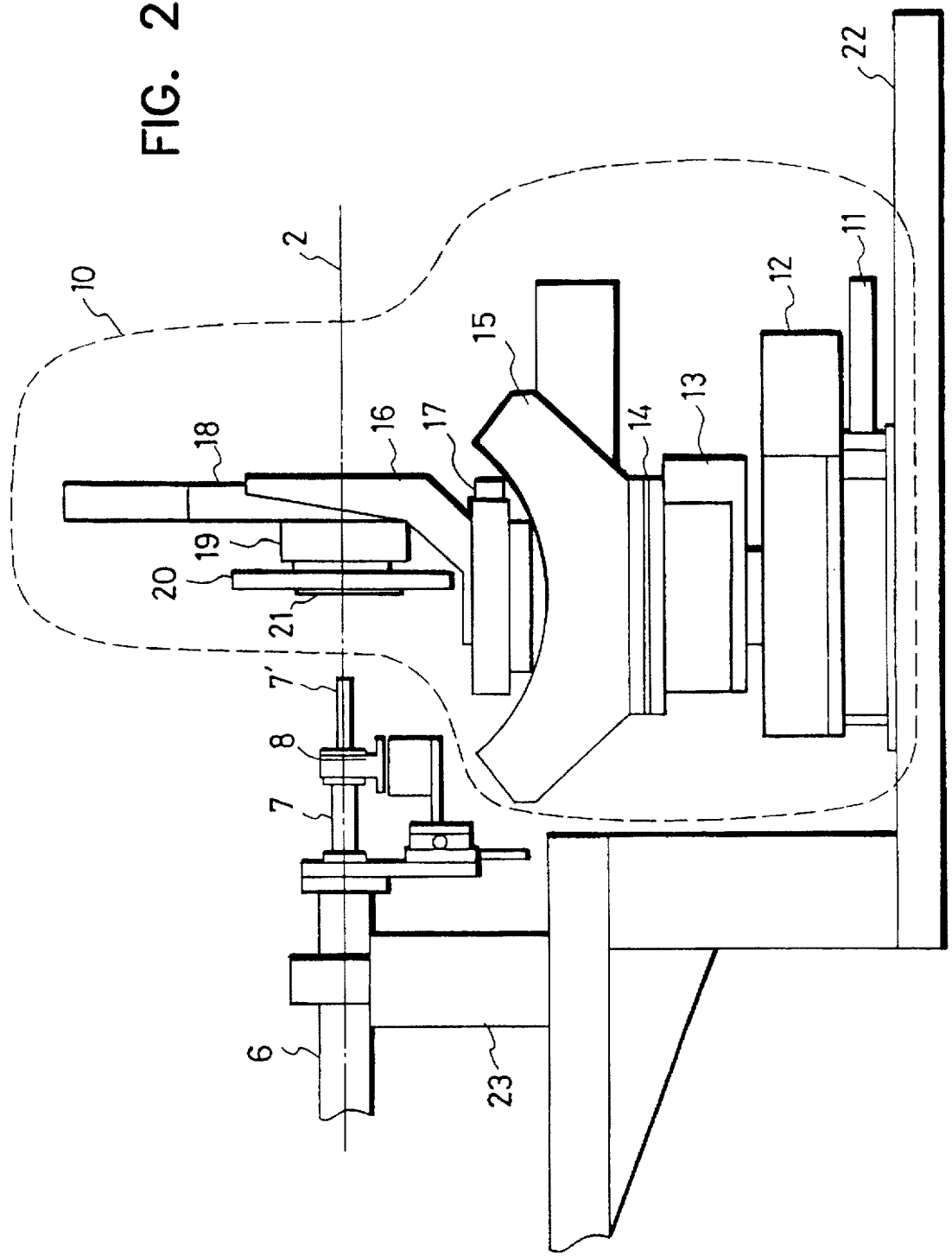
FIG. 2 is a pictorial elevational view showing arrangement of the scanning sample table and the X-ray optical element alignment section of the embodiment of FIG. 1.
Figure 3:
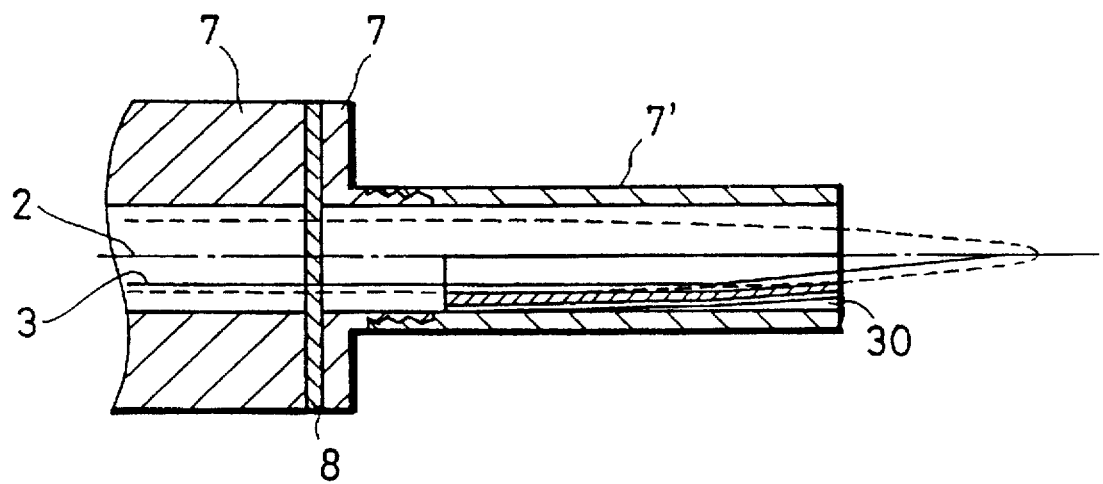
FIG. 3 is a cross-sectional detail view of an X-ray optical element alignment section according to one embodiment of the present invention.

Hereinafter, the preferred embodiments of the invention will be described.
Embodiment 1
FIG. 1 is a top plan view showing a structure of an X-ray analyzing apparatus. FIG. 2 is a side elevational view showing the structure of the apparatus in the vicinity of a sample scanning table. FIG. 3 is a cross-sectional detail view showing a portion of an X-ray optical element in an X-ray optical element alignment mechanism of FIG. 2.

A reflection type X-ray generator 1' generates X-rays from an X-ray target 1. The focal spot size of the X-ray generator 1' can be varied within a range between 10 μm and a few hundred μm. Further, the X-ray target can be composed of various kinds of target materials such as Cu, Fe and W.

Generated X-rays 3 pass through a pipe 6 which has been evacuated by means of a vacuum pump unit 4. A vacuum gate valve (unnumbered) can divide the pipe 6 into an X-ray generator side and a vacuum side. The X-rays 3 passing through the pipe 6 are incident on an X-ray optical element manipulator 7.

The X-ray optical element manipulator 7 is composed of a bidirectional rectilinear mechanism and a biaxial gate mechanism. By these mechanisms, an X-ray optical element 30 can be aligned in four axial directions except along an X-ray axis 2. Alignment sensitivity is kept to 1 μm during a parallel movement of the X-ray optical element and 5 seconds of arc or less during a gate, so that the X-ray optical element 30 can be precisely positioned.

The X-ray optical element manipulator 7 has an X-ray window 8 for separating a vacuum region of the vacuum source from the external atmosphere so that the X-ray optical element 30 attached inside tube 7' is accessible for replacement.

The X-rays 3 incident on the X-ray optical element 30 form a minute X-ray spot on a focal plane on the X-ray axis in the atmosphere, that is, on a sample surface 9 on a sample scanning table 10.

The X-ray optical element available for this embodiment is a small X-ray optical element capable of condensing and imaging X-ray energy of approximately 5 KeV or more, such as a transmission zone plate, a total reflection mirror, a multiplier film mirror, or a curved crystal. As X-ray optical element 30 there is used, for example, an X-ray converging mirror made of Pyrex® glass in the form of a converging mirror having a surface represented by a portion of an ellipsoid, a focal distance of about 1 meter and an operation distance of about 70 mm, and reduces the X-ray generating area by a factor of 10 for imaging. Element 30 is of a type known in the art, such an element being disclosed in, for example, a paper by S. Aoki, "Asymmetric Grazing Incidence Optics for an X-Ray Microscope and Microprobe", appearing in *X-ray Microscopy II*, Proceedings of the International Symposium, Brookhaven, N.Y., Aug. 31–Sep. 4, 1987, published by Springer-Verlag, New York, 1988, pages 102–7.

The incident angle of the X-rays is 5 mrad, and an X-ray reflecting surface inside the X-ray converging mirror 30 is coated with platinum. Therefore, the X-ray reflecting surface reflects X-rays having X-ray energy approximately below 10 KeV, at a reflectance of 80% or more. The X-ray converging mirror 30 is 1.6 mm at most in inside diameter gradually decreasing to 1.2 mm, with an outside diameter of approximately 8 mmφ and approximately 40 mm in length, and is in a shape of one-half of a glass tube which has been divided lengthwise. In FIG. the boundary of the X-ray beam is shown by a solid line, while the broken line shows a virtual curve of the inner wall shape of the mirror, this curve correspond to the ellipse shown by a broken line in FIG. 1 of Aoki, supra.

The X-ray converging mirror 30 is fixed in a stainless tube 7' of 10 mmφ outside diameter so as to house the outside diameter of X-ray converging mirror 30.

The X-ray converging mirror 30 and the holder tube 7' of the X-ray converging mirror are fixed by placing an end of the tube 7' and an end of an outgoing pupil neatly side by side and adhering them to each other with an adhesive. The tube 7' incorporated with the X-ray converging mirror 30 is attached on the X-ray optical element manipulator section 7 by thread engagement between tube 7' and section 7, as shown in FIG. 3. By fixing the X-ray converging mirror 30 to the X-ray optical element manipulator section 7, between an X-ray focal point on a sample surface 9 and the tube 7', there is formed a three-dimensional space of 70 mm equivalent to the operation distance of the X-ray converging mirror. Therefore, a sample of 70 mm in half width or less can be freely rotated through 300° by a rotational stage 13 and gate-rotated through ±45° by a goniostage 15.

Referring to FIG. 2, sample scanning table 10 is composed of a rectilinear stage 11 for moving the sample scanning table 10 in a direction of the X-ray axis, a rotational stage 12 for rotating an X-ray detecting section 21, the rotational stage 13 for rotating the sample scanning table 10, a bracket 14, the goniostage 15, a bracket 16, rectilinear stages 17, 18 and 19, and a large sample holder 20. An object of the rectilinear stage 11 is to adjust a center axis of the scanning rotational stage 13 and the goniostage 15 to the focal point of the X-ray converging mirror 30. The displacement range of the linear stage 11 is approximately 80 mm and its position accuracy is 1 µm.

The rotational stage 12 rotates the X-ray detecting section 21 independently of the sample scanning table rotational stage 13. The X-ray detecting section 21 can rotate within a range of approximately 300° except for an angle obstructed by the X-ray optical element alignment mechanism 7, and the rotational angle can set with rotational accuracy of 1/100.

The X-ray detecting section 21 includes a moving mechanism and an X-ray detector. The moving mechanism is composed of a stage 24 having a rectilinear movement range of approximately 250 mm or more and a rectilinear stage 25 capable of moving approximately 20 mm in a direction perpendicular to both a rotational direction of the sample table and a rotational center direction of the table. Apparatus available as X-ray detectors include semiconductor detectors having an energy resolving power of incident X-rays, gas flow proportional counter tubes, and a detector in which an X-ray fluorescent substrate having a propositional resolving power of the incident X-rays and an image intensifier are combined.

The rotational stage 13 for rotating the sample scanning table 10 can rotates through 300° and its rotational angle accuracy is 1/1000 deg. The goniostage 15 on the rotational stage 13 can rotate through ±45° and its rotational accuracy is 1/1000 deg. The goniostage 15 and the rotational stage 13 have a common rotational axis. Therefore, the bracket 14 is provided between the two stages 13 and 15 to accurately adjust rotational axes of the two stages 13 and 15. The rectilinear stages for three directions 17, 18 and 19, and the bracket 14 which are combined are provided on the goniostage 15 on the scanning sample rotational stage 13. Under these conditions, when the rotational stage 13 rotates through an angle ranging from 0° to 90° and the goniostage 15 rotates at a gate angle within a range of ±10°, the rotational axes of the two stages 13 and 15 are offset by less than 40 µm.

The rectilinear stage 17 is provided on the goniostage 15. The rectilinear stage 17 has a moving range of 25 mm, resolving power of 0.1 µm and reproducability of ±1 µm, and can move and adjust the sample surface 9 to the focal point of the X-ray converging mirror, that is, the rotational center. Therefore, it is possible to mount a sample of approximately 20 mm in thickness or less on the sample scanning table. This rectilinear stage 17 is drive by a side motor.

The bracket 16 is mounted on the rectilinear stage 17 so that the rectilinear stages 18 and 19 moving on two other axes can move perpendicularly to the moving direction of the rectilinear stage 17. Performance of the stages 18 and 19 is equivalent to that of the rectilinear stage 17 including resolving power and position reproducability. The moving ranges of both the stages are around 50 mm, and motors for driving the stages are mounted in rectilinear directions respectively.

A through hole 32 mm in diameter is made in a part, through which the X-ray axis 2 passes, of the bidirectional rectilinear stages 18 and 19 provided vertically on the goniostage 15 and the bracket 16 for supporting the stages. On the large sample holder 20, a large sample, for example, a silicon wafer 6 inches in diameter can be mounted. The large sample holder 20 includes a rectilinear mechanism capable of moving over a range of 70 mm and a rotational mechanism capable of rotating through 360°. Therewith, it is possible to scan all over the surface of a large sample. All the stages except the X-ray detecting section 21 and the large sample holder 20 can be remotely controlled.

There will now be described an example of determining a microscopic area with diffraction X-rays by use of the X-ray analysis apparatus having the above structure. Cu is used for the X-ray target, and an acceleration voltage of the X-ray generator 1' is set at 50 KeV.

X-rays are converged on the sample surface by the X-ray converging mirror 30. The X-ray converging mirror 30 used here is the same as the above-described X-ray converging mirror. Therefore, the distance between an X-ray outlet section and the sample surface to be measured is about 70 mm. Effective energy of the X-rays converged on the sample surface ranges approximately from 5 KeV to 10 KeV. X-ray energy of 5 KeV or less is absorbed in a space of about 150 mm between the X-ray window 8 and the focal point on the X-ray surface. An X-ray generating spot in the X-ray generator 1' is reduced to 20 to 30 µm in diameter. An X-ray converging spot diameter formed by the X-ray converging mirror 30 is the maximum diameter and about 5 µm. An X-ray generating spot diameter is reduced to 1/10 of the diameter of the X-ray converging mirror, but not to the X-ray converging spot diameter. This is due to surface roughness and imperfections in the shape of the X-ray converging mirror 30.

An Al wiring pattern on a silicon wafer 4 inches in diameter is used for the sample 9. The Al wiring is about 2 µm thick and has components with a pitch of 65 µm. The sample 9 is fixed on the sample scanning table with the large sample holder 20. When Cu is used as the X-ray target, characteristic X-rays of Cu having energy of 8 KeV and high intensity peak irradiate the sample surface. The Al wiring is regarded as a thin film in a polycrystalline state, so that a grid interval of the Al surface showing the largest X-ray diffraction intensity (111) is assumed to be a grid interval d of the Al wiring on the silicon wafer. An X-ray wavelength $\lambda$ converged on the sample is chiefly composed of characteristic X-rays of Cu, so that a value of a sample angle $\theta$ which satisfies Bragg's Law is obtained. When the sample is parallel with the X-ray optical axis 2, the a sample angle is regarded as 0°.

$2d \sin \theta = \lambda$, where d represents a spacing, $\theta$ represents a grazing incident angle, and $\lambda$ represents an X-ray wavelength. According to the above law, $\theta$ is 19.24°, to which the sample rotational angle is adjusted. As the X-ray detector, the fluorescent substance $Gd_2O_2S$:TB is applied to a fiber plate to form a fluorescent surface and the fiber plate is fixed to an image intensifier with an adhesive having the same optical refractive index as that of the fiber plate. The angle of the X-ray detector is adjusted to an angle twice as large as the rotational angle of the sample. An intensity of the diffraction X-rays incident on the X-ray detector from the Al wiring is very weak. Therefore, the X-ray detector surface is moved close to the sample surface so that a distance between the two surfaces is 40 mm or less. In order to measure a diffraction X-ray spot with a high S/N ratio, integration of the detector output is performed for 30 seconds for each spot. Scanning is performed at intervals of 5 µm at 500 spots on the sample surface, thereby measuring a characteristic line of Cu diffracted on the surfaces of the samples arranged at intervals of 65 µm respectively.

When the diffraction X-rays are measured, a Ni filter is inserted between the X-ray converging mirror 30 and the sample surface 9 of the embodiment 1 to convert the X-rays into monochrome, or narrow bandwidth, form so that the X-ray detector can measure the diffraction spot more clearly.

Instead of W, Cu is used for the X-ray target 1 and the sample rotational angle is set at about 3°, smaller than that of Embodiment 1 to observe a reflected Laue image of the Al wiring. Further, the large sample holder 20 is removed from the scanning sample table so that the sample surface is perpendicular to the X-ray axis 2. As the sample, there is used an Al thin film having an organic thin film as a supporting body. The sample is directly attached to the rectilinear stage 19. The X-ray detector is placed behind the sample surface on the X-ray axis to observe a transmission Laue image.

Embodiment 2

Embodiment 2 is a method for measuring fluorescent X-rays of a microscopic area. For example, the X-ray converging mirror used in Embodiment 1 is applied as the X-ray optical element. Therefore, a distance between the X-ray outgoing section of the tube 7' and the sample surface to be measured is approximately 70 mm. The conditions of the X-ray generator are, as in Embodiment 1, that the acceleration voltage is 50 KeV, and Cu is used for the X-ray target. The maximum diameter of the X-ray converging spot formed by the X-ray converging mirror 30 is about 5 µm. The energy of the X-rays converged on the sample surface is approximately between 5 KeV and 10 KeV. The X-ray detector is a gas-flow proportional counter tube using PR gas. Sample 9 is a stainless steel mesh with a pitch of 127 µm fixed on the large sample holder 20. The sample 9 is rotated through about 30° by the rotational stage so that the proportional counter tube is placed within a range of 40 mm from the sample. The rectilinear movement stages 18 and 19 are used to scan two-dimensionally an area of 1 mm$^2$ on the sample and measure a mesh image formed by fluorescent X-rays of Fe.

Embodiment 2 can be a method for measuring fluorescent X-rays and also a method in which a semiconductor X-ray detector is used. The semiconductor X-ray detector has remarkably high resolving power, so that it is possible to measure separately the respective fluorescent X-ray energies of plural elements whose atomic numbers are close. For example, a Si wafer 4 inches in diameter is, as a sample, fixed on the large sample holder 20 to detect a minute amount of the element in the vicinity of the surface. In order to employ a total reflection fluorescent X-ray analyzing method, the rotational angle of the sample table is set at 1° or less so that the X-rays are narrowly incident on the sample surface. In order to increase the S/N ratio of the fluorescent X-rays excited from the sample, a monochromatic filter, a Ni thin film 25 µm in thickness for this case, is placed ahead of the sample table. Further, the collimator is arranged between the X-ray converging mirror 30 and the sample surface.

The X-ray converging mirror used in this embodiment has a large divergence angle for the X-rays, approximately 0.6°. Therefore, the collimator is used to restrict the area used on the X-ray reflective surface of the X-ray converging mirror, that is, a cycle of the X-ray converging mirror 30 so that the convergence angle of the X-ray converging beam is 0.1°. The semiconductor X-ray detector is placed within 20 mm of the sample surface. The fluorescent X-rays emitted from the sample surface are measured by varying the rotational angle of the sample formed by the rotational stage 13 starting with 0°. This measurement indicates contamination conditions caused by Fe on a Si-wafer wafer as the sample with respect to a depth as deep as 100 Å.

Embodiment 3

Embodiment 3 is a method for measuring transmission X-rays of the microscopic area, and the X-ray converging mirror used in Embodiments 1 and 2 is applied as the X-ray optical element. Therefore, the distance between the X-ray outlet section of tube 7' and the sample surface to be measured is approximately 70 mm. As in Embodiments 1 and 2, the conditions of the X-ray generator are that the acceleration voltage is 50 KV and that Cu is used for the X-ray target. The maximum diameter of the X-ray converging spot formed with the X-ray converging mirror 30 is about 5 µm. The efficient energy of the X-rays converged on the sample surface ranges from 5 KeV to 10 KeV.

The X-ray detector is the gas flow proportional counter tube. The large sample holder 20 is removed from the sample scanning table and the sample is directly attached to the rectilinear stage 19 in order to utilize a through hole made on the rectilinear stages 18 and 19, and the bracket 16 of the sample scanning table 10. The stainless mesh with 127 µm mesh pitch is used as the sample. The proportional counter tube is moved on the X-ray axis 2 by the rotational stage 12 and drawn to a position extremely close to a back face of the bracket 16 of the sample scanning table. The rectilinear stages 18 and 19 are used to two-dimensionally scan the samples of 1 mm$^2$ at an interval of 10 µm. The characteristic X-rays of Cu are measured with the proportional counter tube and the mesh image of the Cu is obtained from the change in intensity of the transmission X-rays.

In the above Embodiment 3, a transmission image of a sample whose shape is visible was measured with apparatus according to the invention. However, with this apparatus it is also possible to observe the interior conditions of a material as thin as a few µm which cannot be observed by a light-optic microscope and so on. When the sample is irradiated with the characteristic X-rays of Cu, even if the sample is so thin that its appearance is uniform, the transmission X-ray intensity is extremely low in a part having a large content of Fe, Ni and so on and in a part having a heavy element content. This phenomenon is caused by an effect of an absorption end inherent in the element and a characteristic of the heavy element that it hardly transmits X-rays. In order for the apparatus have high resolving power, for example a semiconductor X-ray detector is used in a method for measuring the transmission X-rays. It is possible to determine an element composition of the sample by detecting a change in energy intensity of the incident X-rays which are incident on the sample and a change in energy intensity of the transmission X-rays. When the sample makes no change in the transmission X-rays, the sample is tilted with the rotational stage 13 and the goniostage 15. It is also possible to estimate an approximate interior structure in one direction of the sample from the change in the transmission X-ray intensity in a particular direction of the sample.

Embodiment 4

Figure 4:
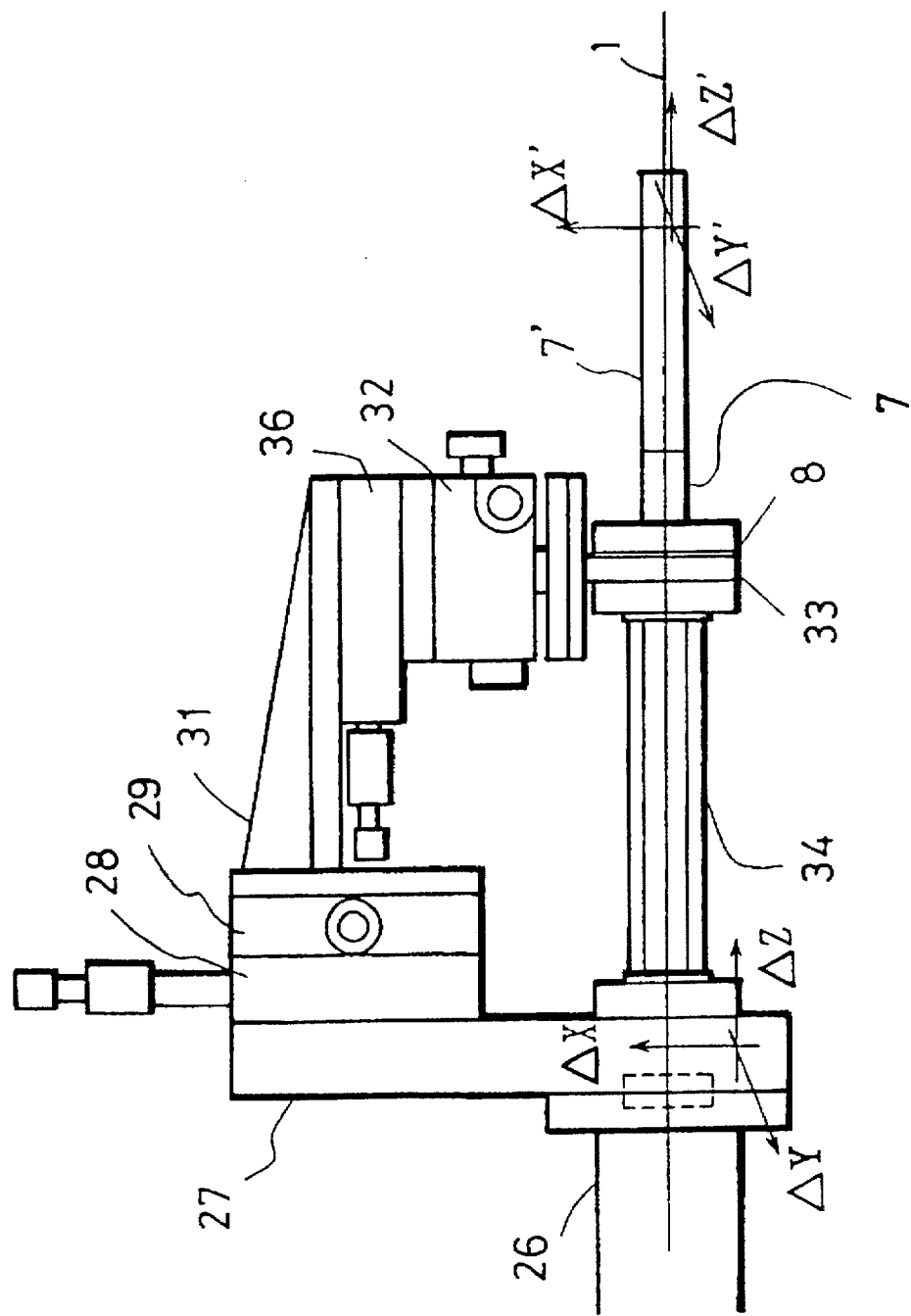
FIG. 4 is a pictorial elevational view of a portion of the structure shown in FIG. 2.
Figure 5:
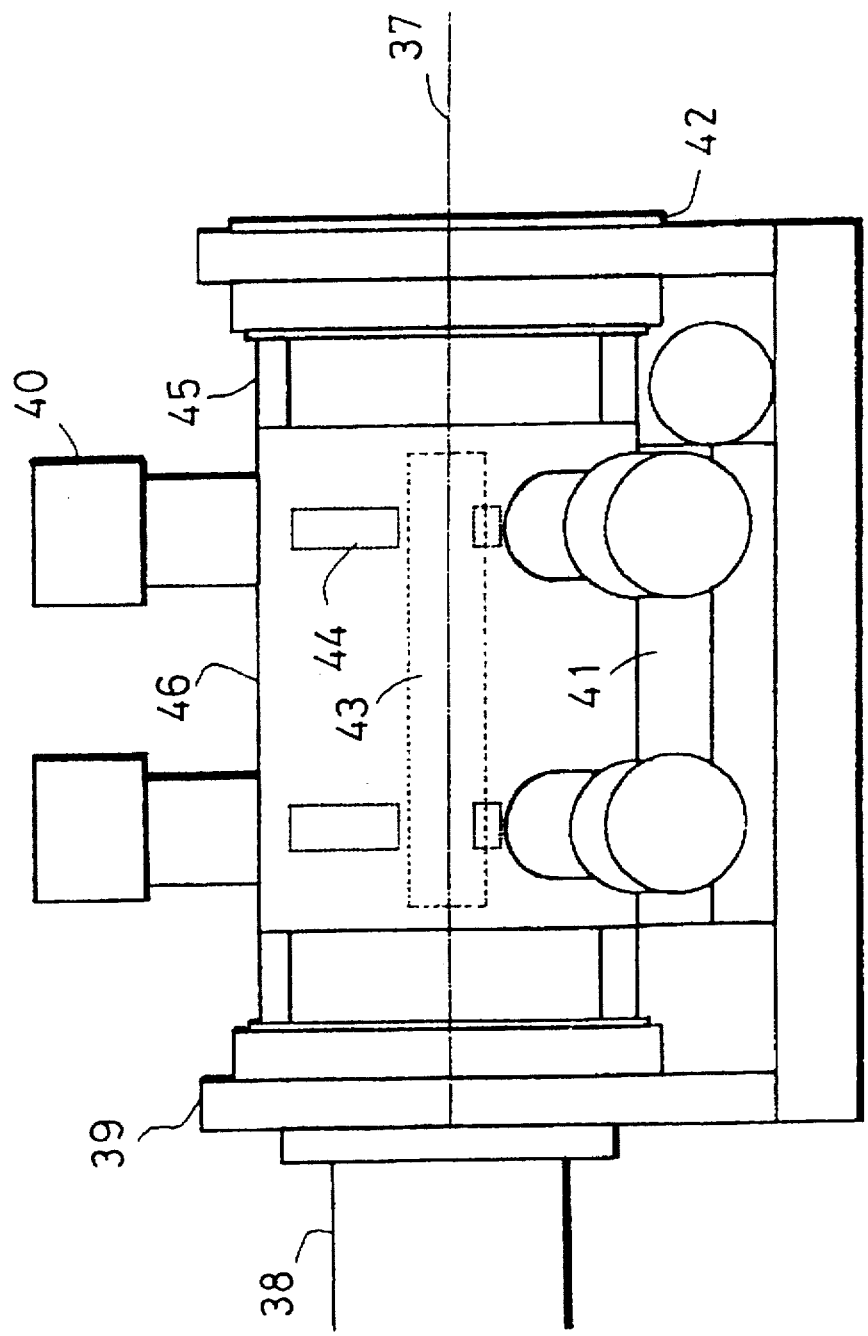
FIG. 5 is a elevational view of a prior art apparatus.

The description of Embodiment 4, will include a detailed description of the mechanism and operation of the X-ray optical element manipulator used for converting irradiation X-rays into a microbeam to diffracted X-rays of a microscopic area, to analyze the fluorescent X-rays of a microscopic area and to measure the transmission X-rays of a microscopic area. FIG. 4 is a schematic diagram of a structure of an embodiment of the X-ray optical element manipulator according to the invention. As shown, a vacuum flange 27 which serves as a reference surface facing a vacuum flange 26 is provided with a gasket. Compact linear stages 28 and 29 are fixed in an intersecting state at a location separated from the X-ray optical axis 2 of the vacuum flange 27. Each of the rectilinear stages has a moving distance of 10 mm or more for each rectilinear stage independently, a sensitivity of 1 µm, and both yawing and pitching of $10^{-4}$ rad or less, and with the incorporation of an operation micrometer having a minimum readout of 1 µm, high-precision positioning can be performed.

A bracket 31 is fixed on the combined stages 28 and 29, and a compact rectilinear stage 36 is fixed on bracket 31. The performance of this stage is the same as that of the above-mentioned compact stage, but because a micrometer head is attached sideways to the rectilinear stage, the movement amount of the stage is not restricted by the micrometer head. A three-axis gate table 32 is fixed to this stage 36. This gate table has a mechanism for moving the center of a movable carriage along a spherical surface having a diameter corresponding to the distance from the table itself to the movable carriage and for tilting the movable carriage in two directions, and a mechanism for rotating the movable carriage on a plane parallel to the table itself, the rotational angle thereof being ±2.5° with a precision of 3 seconds or arc or less.

A bracket 33 having a hole drilled therein so as not to become an obstacle to the X-ray optical axis is provided over the gate table. O-ring grooves for maintaining vacuum are formed at both sides of the bracket, respectively. A flexible vacuum tube 34 connected to the vacuum flange 27 is connected on one side of the bracket, and on the other side thereof, an X-ray window 8 and mirror mount tubes 7' and 7 are connected. To the X-ray window, there is affixed, as a supporting means, a stainless steel sheet having a 1 mm thickness and provided with a 2–4 mm diameter hole. A Mylar film 25 µm in thickness in the form of an organic high polymer transparent film is pasted above the stainless steel sheet so as to cover the hole so that the Mylar film is not broken due to the pressure difference between the vacuum and the ambient atmosphere. Further, the mirror mount tube is divided into the tube main body 7' which is integrated with the X-ray mirror and the portion 7 which supports the tube, and a tap is cut where the portions are connected together so that these two portions are easily detached. The portion 7, which supports the tube, is attached to the bracket 8 so as to sandwich the X-ray window, thereby providing a vacuum section up to the X-ray window.

Since the X-ray optical element manipulator is constructed as above, X-rays permeate the X-ray window, and X-rays having energy of 5 KeV or more and usable in the atmosphere penetrate the X-ray window with a transmittance of 95% or more. Further, because the force applied on the vacuum portion due to the atmospheric pressure pulls the mirror mount tube toward the vacuum flange 27, the vacuum components are designed such that the above pulling force in the direction of the flange 26 falls within 3 kg weight or less. Practically, the inner diameters of the vacuum tube 34 and the bracket 33 are set at 10 mm or less, and to enable a stable alignment to be made, even if the tube is pulled by this level of force, the rectilinear stages 28, 29 and 36 and the gate table 32 have a lock mechanism with a load resistance of 3 kg or more in the direction of the force application, and the brackets 31 and 33 are made of stainless steel of high rigidity.

Figure 6A:
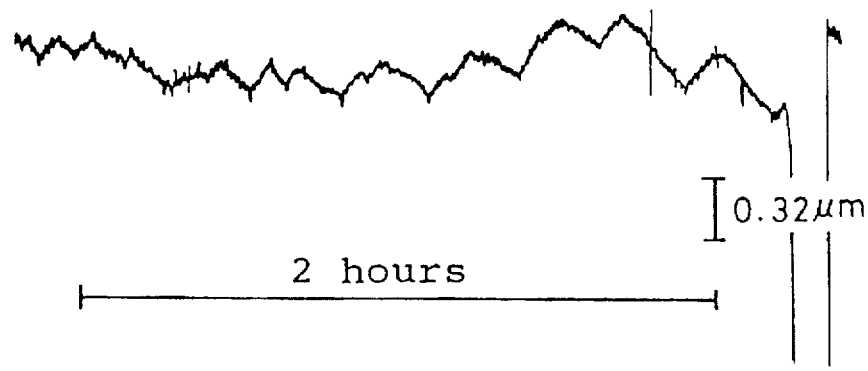
FIGS. 6A, 6B and 6C are graphs illustrating the operation of one embodiment of the present invention.
Figure 6B:
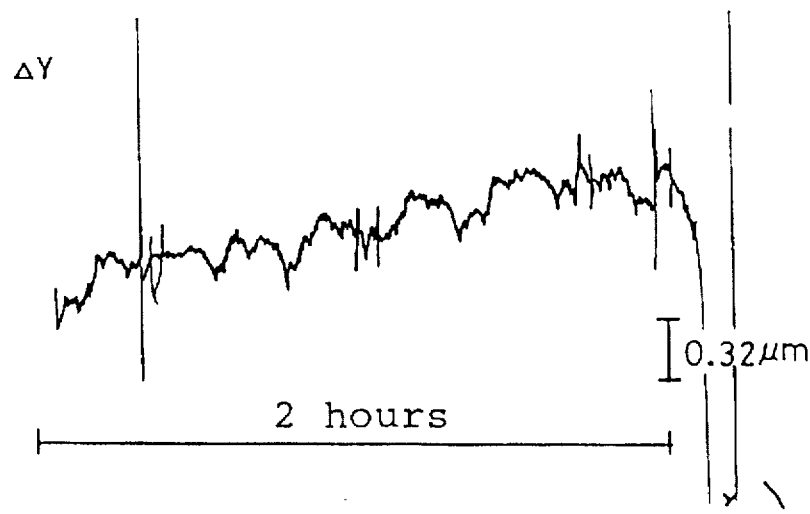
Figure 6C:
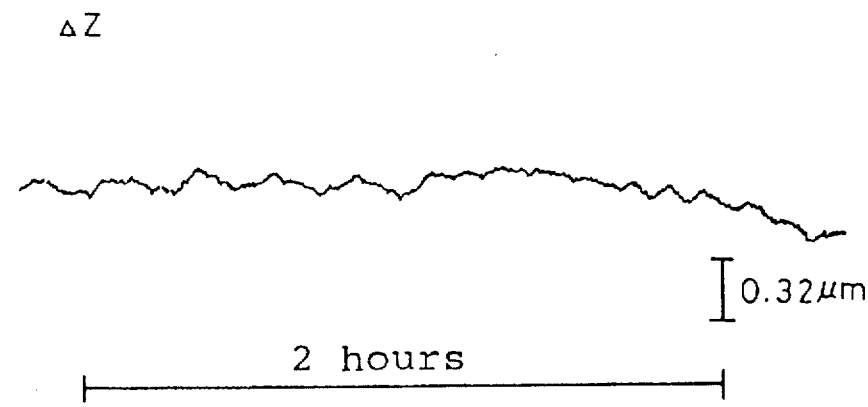
Figure 7A:
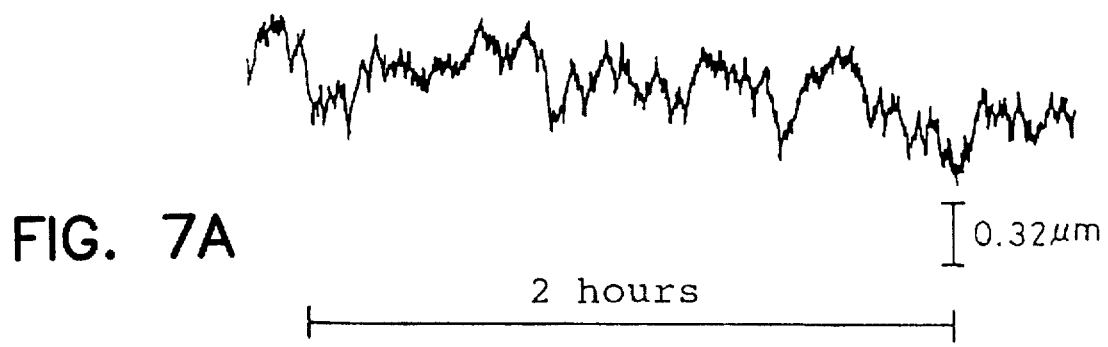
FIGS. 7A, 7B and 7C are graphs illustrating the operation of another embodiment of the present invention.
Figure 7B:
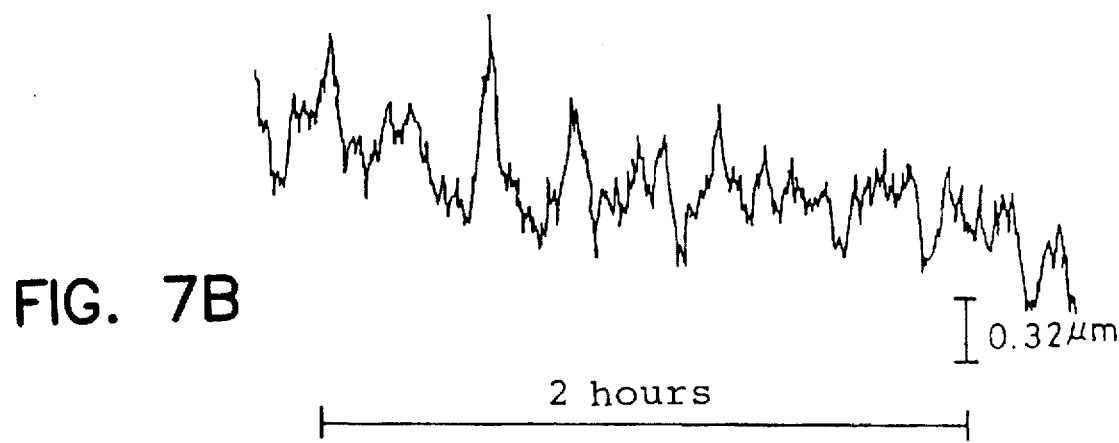
Figure 7C:
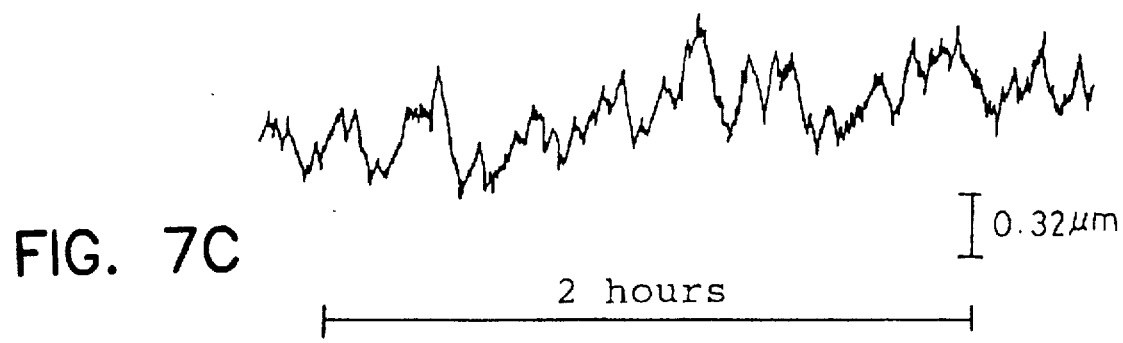

The following experiments were conducted to examine the stability of the manipulator. That is, the pipe was evacuated from the side of the vacuum flange 26, to keep a stable vacuum state of $10^{-5}$ Torr or under. Then, each of the moving mechanisms was locked and fluctuation in the vacuum flange 27 was measured with a 0.01 µm resolution laser displacement gauge. The measurements were each taken relative to three directions X, Y and Z as shown in FIG. 4, the results of which are shown in FIGS. 6A to 6C. In the same manner, fluctuation in the mirror mount tube 7' was measured, the results of which are shown in FIGS. 7A to 7C (Y being perpendicular to the plane of FIG. 4).

It can be considered that the mirror mount tube 7' displaces the vacuum flange 27 and an actual fluctuation width is obtained by subtracting the fluctuation width of the vacuum flange from the fluctuation width of the mirror mount tube. Accordingly, it has been found from FIGS. 6A to 7C that the fluctuation of the mirror mount tube relative to the vacuum flange is a fluctuation of 0.5 µm width or less in the three directions.

With this kind of combination the stroke of each axis was ±2 mm in the linear direction with a precision of 1 µm, while in the gate mechanism the angle was ±2.5° with a precision of 5 seconds of arc or less.

The method for aligning the X-ray mirror using this manipulator is, for example, such that an alignment is first performed using visible light, and then another alignment is performed using X-rays of the wavelength to be used. In this case, the X-ray mirror is about 10 mm in outside diameter and 40 mm in length and is intended to form a minute converged spot at a focal position with X-rays having an energy of 5 KeV or more.

Firstly, visible light is made to coincide with the X-ray optical axis 2 using a mirror, and the visible light is reflected by the X-ray mirror in the mirror mount tube 35. The visible light to converge on the X-ray optical axis 2 is viewed on white paper, and if it does not converge, first the axial displacement from the X-ray optical axis of the X-ray mirror is corrected by means of the gate mechanism of the gate table 7. Next, the light reflected from the X-ray mirror is moved to a desired location by the rectilinear tables 28, 29 and 36. Again, the axial displacement of the X-ray mirror is examined in the manner as described previously and corrected, and again, the reflectance light is moved by the rectilinear stages and such operation is repeated until the moving mechanisms do not move. Then, the X-rays to be used are introduced into the X-ray optical axis, and the converged X-rays formed by the X-ray mirror are observed by using a high-sensitivity X-ray two-dimensional position detector or the like. If the axis of the X-ray mirror or the X-ray converging position has been corrected, adjustment is performed in the same manner as in the case of visible light until the moving mechanisms do not move, and lastly, each of the moving mechanisms is locked. In this way, adjustment of the X-ray mirror is performed. Although in this embodiment a three-axis linear stage mechanism was used, if mirror alignment has a four-axis direction, a form lacking the rectilinear stage 36 of FIG. 4 of the embodiment would result and this form is also included in this embodiment. Further, although a three-axis gate table is used in this embodiment, the use of a biaxial gate table also would be included in this embodiment.

Embodiment 5

Figure 8:
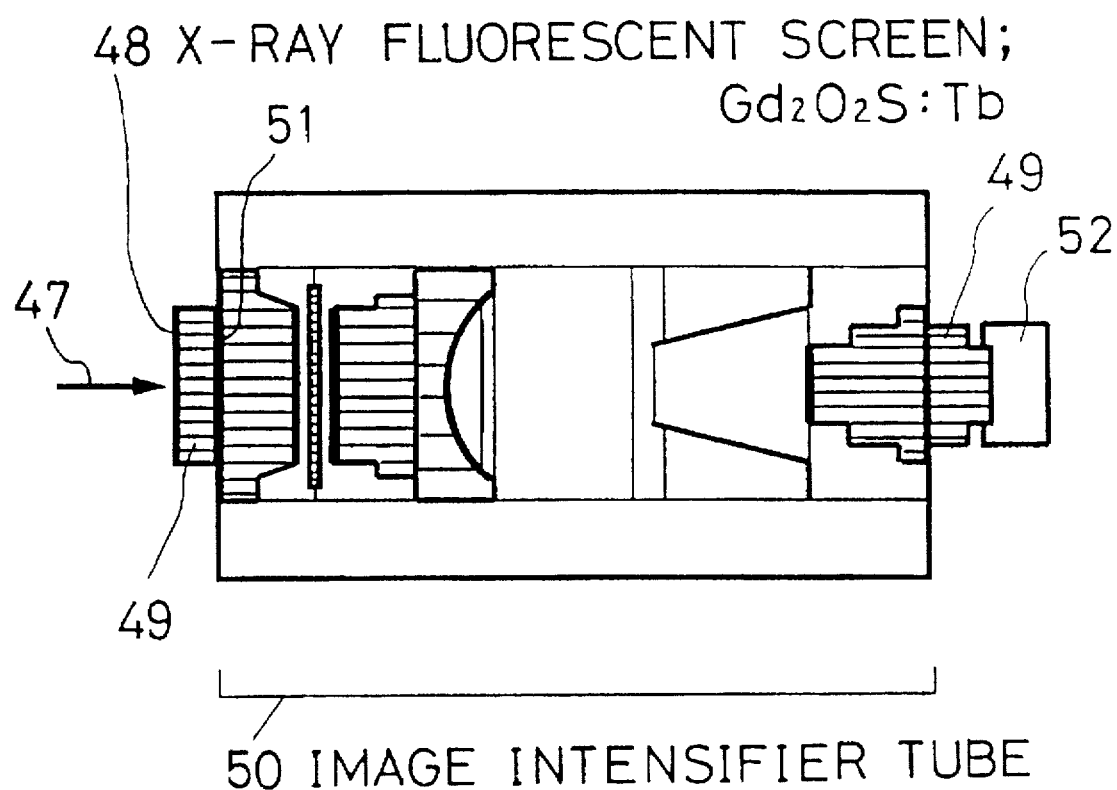
FIG. 8 is a pictorial view of an X-ray position detector according to the present invention.

Embodiment 5 employs an X-ray diffraction position detector. FIG. 8 is a pictorial view showing the structure of a detector according to the invention. An X-ray fluorescent screen, or surface, 48, is formed on an optical fiber plate 49 mounted at one end of an image intensifier tube 50 and a CCD 52 is coupled to the other end of tube 50 via an optical fiber plate 49 to achieve the maximum use efficiency of light. Though the X-ray fluorescent surface used in this invention was made by a precipitation method, it can be also formed by a physical or chemical film forming method such as a coating method, a deposition film forming method such as a coating method, deposition and sputtering by use of positional resolving power and a coating film thickness.

The X-ray fluorescent surface 48 is designed to have high sensitivity and high position resolving power when the wavelength of diffraction X-rays is within a range between 0.7 Å and 2 Å. The surface was formed on a fiber plate 49 having a diameter of 2 mm and a thickness of 3 mm by a precipitation method with a fluorescent material, $Gd_2O_2S$:Tb. The thickness of fluorescent surface 48 can be determined by measuring the amount of X-rays absorbed by the fluorescent material $Gd_2O_2S$:Tb with relation to the X-ray wavelength to be used, and is obtained by the following equation:

$I/IO=\exp[-\mu(p/p0)t]$, where $I/IO$ is the X-ray transmittance of the fluorescent material, $\mu$ is a linear absorption coefficient of the used X-rays, $p0$ is the density of the fluorescent material $Gd_2O_2S$:Tb, $p$ is a filling rate of the fluorescent material, and $t$ is the thickness of the fluorescent surface, or screen, 48. In order to realize high positional resolving power on the X-ray fluorescent surface, grain sizes of the fluorescent material were arranged to be almost uniform and actually were approximately 3 µm.

Figure 9:
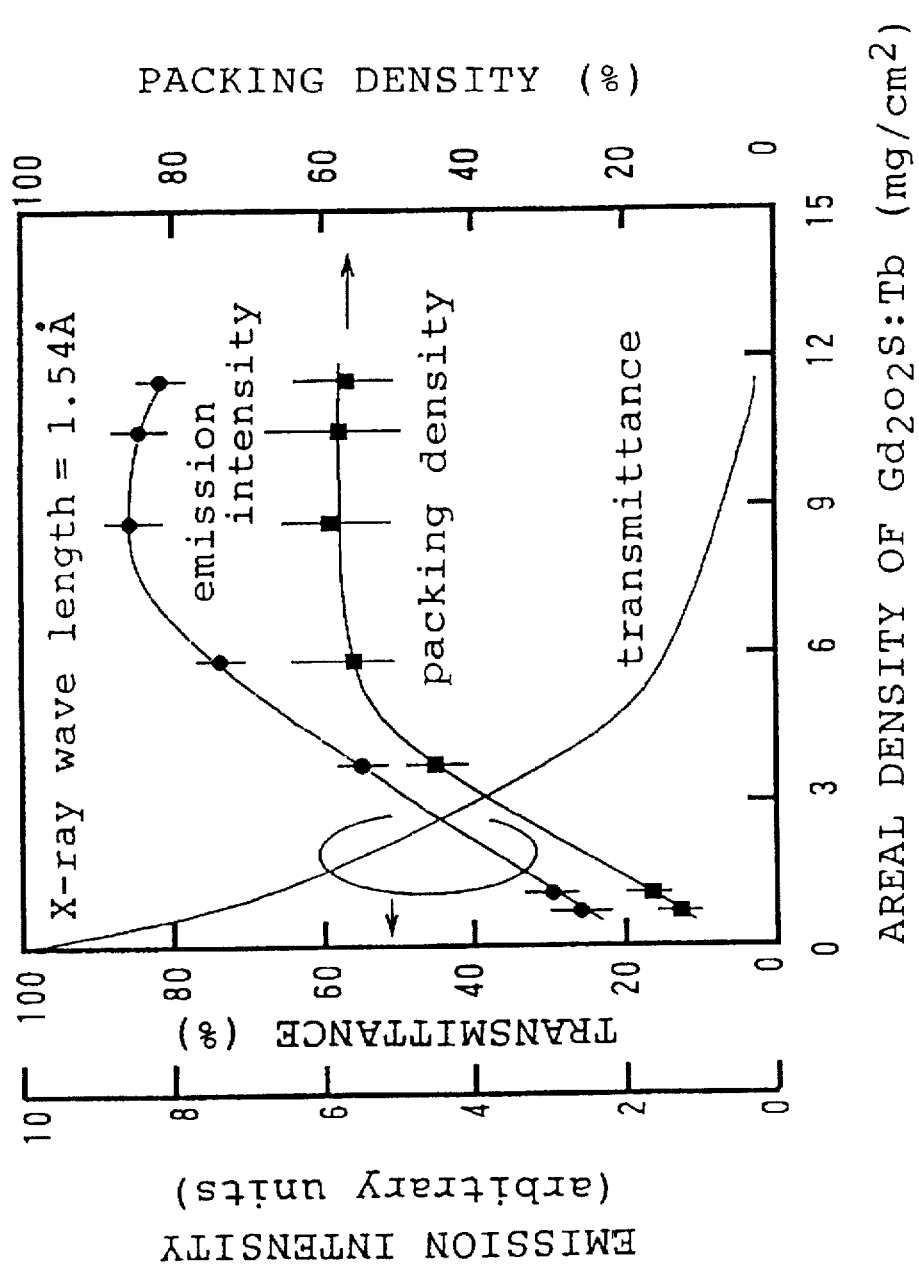
FIG. 9 is a graph showing relationships between the surface density of an X-ray fluorescent surface of $Gd_2O_2S:Tb$, and the transmittance, the packing density and the emission intensity respectively of the $Gd_2O_2S:Tb$ which are observed when the X-ray wavelength is 1.54 Å.

FIG. 9 shows a relationship between the transmittance of the X-rays, the packing density and the emission intensity of the fluorescence X-rays, all with respect to the surface density of the $Gd_2O_2S$:Tb fluorescent surface, which are observed when the X-ray wavelength is 1.54 Å. When the surface density is 5 mg/cm² or less, the packing density is as low as 10% to 40% and the absorption amount of the X-rays and the emission efficiency of the fluorescence become small. On the other hand, when the surface density of the X-ray fluorescent surface $Gd_2O_2S$:Tb is 5 mg/cm² or more, the filling rate is almost constant around 60%. Further, the irradiation direction of the X-rays and the direction of a visible light are opposite when the surface density exceeds approximately 10 mg/cm², so that if the film thickness of the X-ray fluorescent surface exceeds a predetermined value, the surface does not transmit the emitted light and the emission intensity apparently decreases. Therefore, in order to detect an X-ray diffraction pattern with an X-ray wave length of 1.54 Å, the optimum surface density is between 8 mg/cm² and 10 mg/cm².

Figure 10:
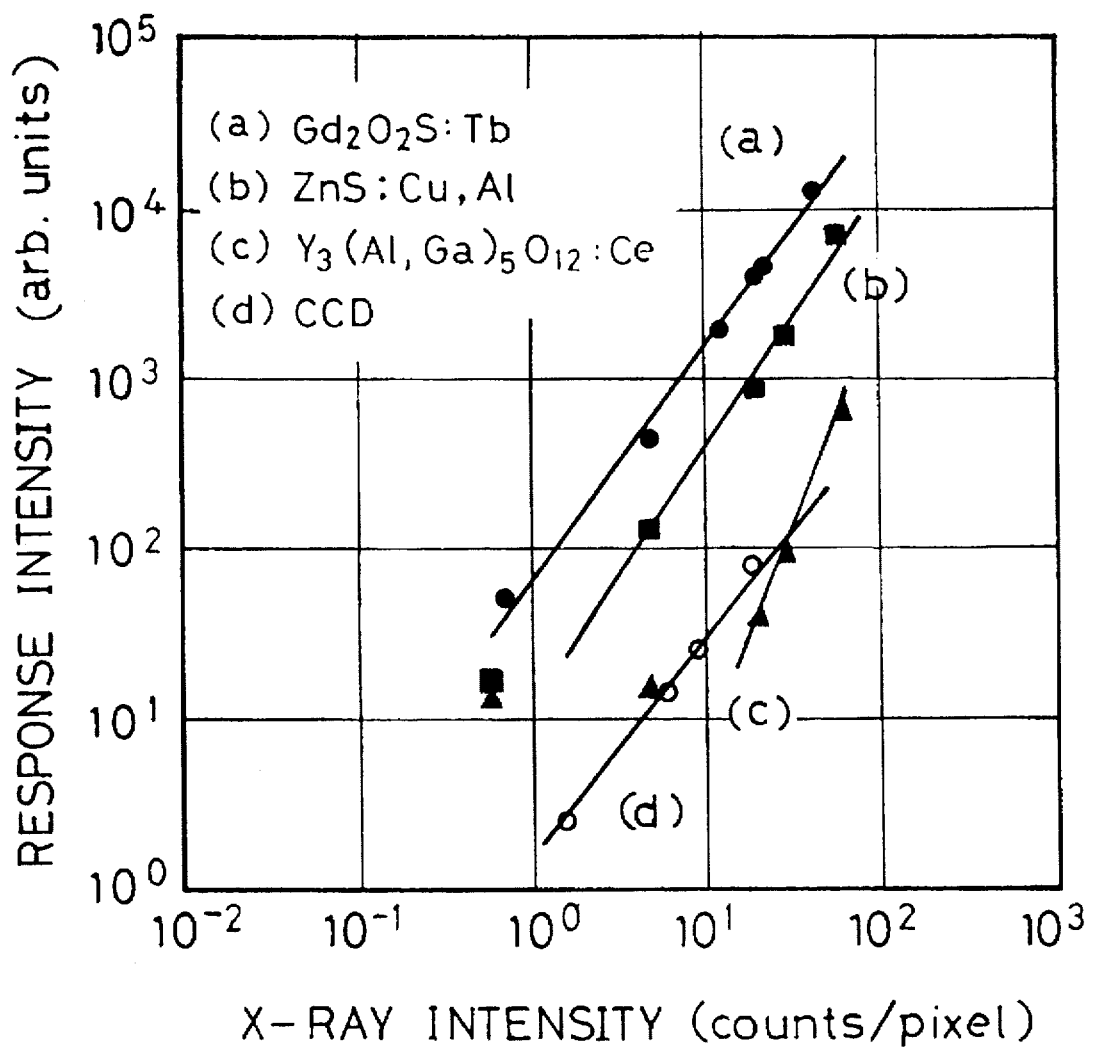
FIG. 10 is a graph showing relationships between the X-ray intensity and the response intensity of the X-ray diffraction two-dimensional detector which is observed when the X-ray wavelength is 1.54 Å.

FIG. 10 shows results of investigating the sensitivity of the X-ray diffraction one-dimensional position detector having a structure shown in FIG. 8 by use of the X-ray fluorescent surface.

FIG. 10 shows results of investigating a relationship between the X-ray intensity of the X-ray diffraction two-dimensional position detector having the $Gd_2O_2S$:Tb fluorescent surface and its response intensity at the wavelength 1.54 Å. For reference, each response intensity of two kinds of fluorescent surfaces and an X-ray CCD detector in addition to the $Gd_2O_2S$:Tb fluorescent surface was plotted. It was found that when the surface density of the fluorescent screen is about 10 mg/cm², an X-ray photon responds to one pixel and the fluorescent screen has a dynamic range of about 2.5 orders of magnitude, i.e. $10^{2.5}$. The positional resolving power was about 20 µm. Though Embodiment 5 represents a case where the X-ray wavelength is 1.54 Å, because of the relationship between the X-ray fluorescent surface and the X-ray absorption, it is necessary to increase the surface density of the X-ray fluorescent surface as the wavelength decreases depending on whether or not the X-ray absorption edge has an effect.

Figure 11:
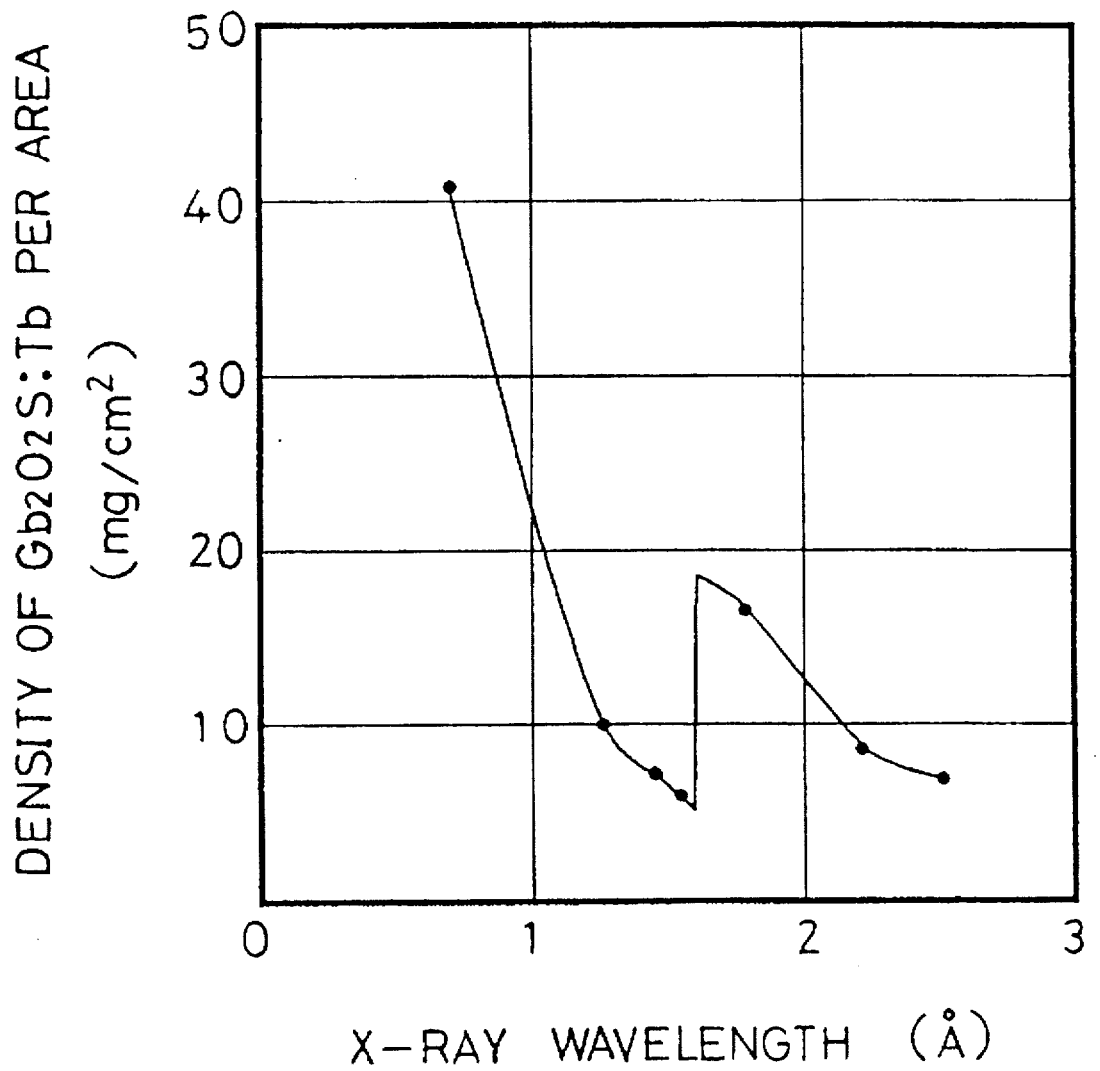
FIG. 11 is a graph showing the relationship between X-ray wavelengths between 0.7 Å and 0.2 Å, and the optimum surface density of the fluorescent screen $Gd_2O_2S:Tb$.

FIG. 11 shows the surface density of the fluorescent material $Gd_2O_2S$:Tb which is observed when the fluorescent intensity of the fluorescent screen with respect to the X-ray wavelength becomes strongest. When the wavelength of the diffraction X-rays is between 0.7 Å and 0.2 Å, the fluorescent surface has a surface density ranging from 5 mg/cm² to 50 mg/cm². In the structure of the diffraction X-ray two-dimensional position detector shown in FIG. 8, the response sensitivity of the detector and the dynamic range were the same as those of a case that the X-ray wavelength is 1.54 Å, but the position resolving power ranged between 15 µm and 60 µm because the thickness of the fluorescent surface depends on the used X-ray wavelength.

Embodiment 6

Figure 12:
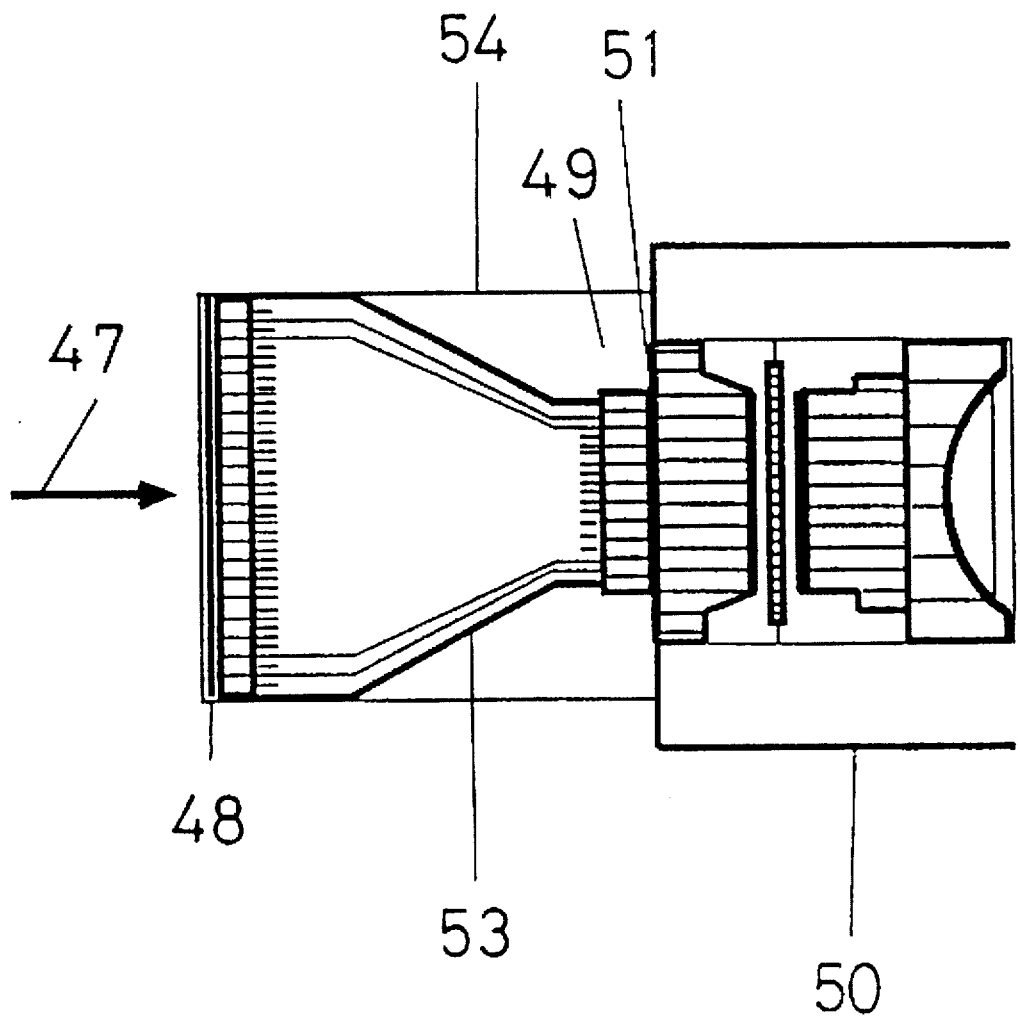
FIG. 12 is a pictorial view of a part of the structure of the X-ray diffraction detector in which the X-ray fluorescent surface and the tapered fiber plate are combined.

Based on the results shown for Embodiment 5, a light receiving area can be expanded by combining the X-ray fluorescent surface 48 and a tapered fiber plate 53. FIG. 12 is a schematic diagram showing a combination of a tapered fiber plate 53 having an area reduction ratio of approximately one third and the X-ray fluorescent surface 48 of $Gd_2O_2S$:Tb. X-Ray fluorescent surface 48 and tapered fiber plate 53 are held within a case, or housing, 54. In Embodiment 6, the effective diameter of the image intensifier tube 50 is 18 mm, so that the diameter of the effective X-ray fluorescent surface is 54 mm. In this case, light lost due to the tapered fiber plate is about 30% of that of the X-ray diffraction two-dimensional detector having a structure shown in FIG. 8, which is a considerably high sensitivity.

On the other hand, as the position resolving power increases by a reciprocal of the reduction rate, it becomes approximately 60 µm when the X-ray wavelength is 1.54 Å as in Embodiment 5. Further, when the X-ray wavelength is between 0.7 Å and 2 Å, the position resolving power ranges from 45 µm to 150 µm. In Embodiments 5 and 6, there was used the image intensifier tube with an effective diameter of 18 mm. However, if the image intensifier tube with an effective diameter of approximately 40 mm is used and combined with the tapered fiber plate 53 with an area reduction ratio between one third and one fifth, the diameter of the X-ray receiving surface becomes between 120 mm and 200 mm, whereby it becomes possible to detect the X-ray diffraction pattern in a large area. Though Embodiments 5 and 6 referred to the embodiments of the X-ray diffraction position detector, the use of this position detector enables intensity measurement and two-dimensional observation of fluorescent X-rays and transmitted X-rays.

According to the present invention, by using the same apparatus structure as the above with transmission X-rays, diffraction X-rays, and fluorescent X-rays, it is possible to identify a sample material and measure a chemical composition of the material in a microscopic area easily and with high sensitivity.

This application relates to subject matter disclosed in Japanese Application numbers 5-67135, filed on Mar. 25, 1993; 5-91683, filed on Apr. 19, 1993; and 5-91688, filed on Apr. 19, 1993, the disclosures of which are incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. An X-ray detector, comprising an X-ray fluorescent screen made of $Gd_2O_2S$:Tb and having a surface density ranging from 5 mg/cm$^2$ to 50 mg/cm$^2$.

2. The X-ray detector according to claim 1, further comprising:
   a charge combining device (CCD), and
   an image intensifier tube coupling said screen to said charge combining device.

3. The X-ray detector according to claim 1, further comprising an optical fiber plate carrying said X-ray fluorescent screen and disposed for conducting radiation from said screen to said image intensifier tube.

4. The X-ray detector according to claim 3, wherein said optical fiber plate is tapered toward said image intensifier tube.

* * * * *